United States Patent Office 3,206,420
Patented Sept. 14, 1965

3,206,420
BLENDS OF A VINYLIDENE CYANIDE POLYMER AND A POLYALKYLENE GLYCOL OR DERIVATIVE THEREOF
Charles L. Smart, Millington, N.J., and Victor S. Salvin and John R. Adams, Jr., Charlotte, N.C., assignors to Celanese Corporation of America, New York, N.Y., a corporation of Delaware
No Drawing. Filed Apr. 28, 1961, Ser. No. 106,158
11 Claims. (Cl. 260—23)

The present invention relates to improving the dyeability of synthetic resinous polymers of vinylidene cyanide.

Resinous copolymers generally containing in excess of about 45% of vinylidene cyanide (methylene malononitrile or vinylidene dinitrile) units copolymerized with one or more ethylenically unsaturated monomers such as vinyl acetate or the like are described in United States Patents No. 2,615,865 through 2,615,880, inclusive, 2,628,954, 2,650,911, 2,654,724, 2,654,728, 2,657,197, 2,716,104, 2,716,105, 2,716,106 and 2,740,769 and Canadian Patent No. 569,262.

The copolymers usually comprise units of vinylidene cyanide alternated with one or more copolymerizable monomers selected from the following classes of compounds;

(1) Vinyl esters of aliphatic monocarboxylic acids, preferably of the structure RCOOH, wherein R is alkyl, such as vinyl acetate, vinyl propionate, vinyl butyrate, vinyl isobutyrate, vinyl valerate, vinyl caproate, vinyl enanthate and the like. The copolymerization with vinylidene cyanide of such copolymerizable monomers and the resulting copolymers are described more fully in U.S. Patent 2,615,866, issued October 28, 1952.

(2) Vinyl esters of the structure

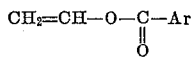

wherein Ar is an aromatic radical in which all the hydrogen atoms are attached to carbon atoms, such as vinyl benzoate; homologs of vinyl benzoate of the formula

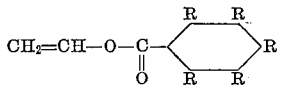

wherein each R is a member of the class consisting of hydrogen atoms or lower alkyl radicals, for example, vinyl toluate and the like; monomers of the above general class wherein the aromatic radical is halogen substituted, such as vinyl p-chlorobenzoate, vinyl o-chlorobenzoate, vinyl m-chlorobenzoate, and similar vinyl halobenzoates, and monomers of the above general class wherein the aromatic radical is alkoxy substituted, for example, vinyl p-methoxybenzoate, vinyl o-methoxybenzoate and vinyl p-ethoxybenzoate. The copolymerization with vinylidene cyanide, of such monomers, and the resulting copolymers are disclosed in U.S. Patent 2,615,867, issued October 28, 1952;

(3) Styrene and substituted styrenes of the general formula

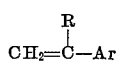

wherein Ar is an aromatic radical in which all of the hydrogen atoms are attached to carbon atoms and R is a member of the class consisting of hydrogen atoms and alkyl radicals, preferably those which contain from 1 to 4 carbon atoms, such as styrene itself, and substituted styrenes such as alpha-methyl styrene, alpha-ethyl styrene, alpha-butyl styrene, alpha-chlorostyrene, alpha-bromostyrene, 2,5-dichlorostyrene, 2,5-dibromostyrene, ortho-, meta-, and para-methoxystyrene, para-alpha-dimethyl styrene, paramethyl styrene, 3,4-dichlorostyrene, 3,4-difluorostyrene, 2,4-dichlorostyrene, 2,4,5-trichlorostyrene, dichloro-monofluorostyrenes and the like. Copolymerization of vinylidene cyanide with styrene and substituted styrenes is disclosed in U.S. Patent 2,615,868, issued October 28, 1952;

(4) Olefins of the general structure

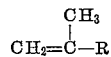

wherein R is an alkyl radical, preferably containing from 1 to 6 carbon atoms, such as isobutylene (2-methylpropene-1), 2-methyl-butene-1, 2-methylpentene-1, 2,3-dimethyl-butene-1, 2,3-dimethyl-pentene-1, 2,3,3-trimethylbutene-1, 2,3,4-trimethylpentene-1, 2,6-dimethyloctene-1, 2-methylnonadecene-1, and the like. Copolymerization of such olefins with vinylidene cyanide is disclosed in U.S. Patent 2,615,865, issued October 28, 1952;

(5) Alkyl esters of methacrylic acid which possess the structure

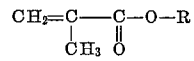

wherein R is an alkyl radical, preferably containing from 1 to 8 carbon atoms, for example, methyl methacrylate, ethyl methacrylate, propyl methacrylate, butyl methacrylate, amyl methacrylate, hexyl methacrylate, heptyl methacrylate, octyl methacrylate, decyl methacrylate, and the like. Vinylidene cyanide/alkyl methacrylate copolymers and their preparation are disclosed in U.S. Patent 2,615,871, issued October 28, 1952;

(6) 2-halogenated monoolefins of the structure

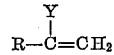

wherein R is a lower alkyl radical such as methyl, ethyl, propyl, or butyl, and Y is a halogen atom, such as 2-chloropropene, 2-chlorobutene, 2-chloropentene, 2-chlorohexene, 2- chloroheptane, 2-bromobutene, 2- bromoheptene, 2-fluorohexene, 2-fluorobutene, 2-iodopropene, 2-iodopentene, and the like. Copolymerization of these compounds with vinylidene cyanide is disclosed in U.S. Patent 2,615,877, issued October 28, 1952;

(7) Isopropenyl esters or organic monocarboxylic acids, preferably of the formula RCOOH, wherein R is an alkyl radical containing from 1 to 6 carbon atoms, and including isopropenyl acetate, isopropenyl propionate, isopropenyl isobutyrate, isopropenyl valerate, isopropenyl caproate, and isopropenyl enanthate; as well as isopropenyl esters of aromatic carboxylic acids, for example, isopropenyl benzoate, isopropenyl p-chlorobenzoate, isopropenyl o-chlorobenzoate, isopropenyl m-chlorobenzoate, isopropenyl toluate, isopropenyl alpha-chloroacetate, isopropenyl alpha-bromo propionate, and the like; the copolymerization of all of which with vinylidene cyanide is described in U.S. Patent 2,615,875, issued October 28, 1952;

(8) Vinyl esters of alpha-halo saturated aliphatic monocarboxylic acids of the structure

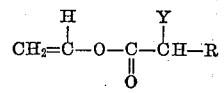

wherein R is a member of the class consisting of hydrogen and an alkyl radical, preferably a lower alkyl radical, and Y is a halogen atom, such as vinyl alpha-chloroacetate, vinyl alpha-bromoacetate, vinyl alpha-chloropropionate, vinyl alpha-bromopropionate, vinyl alpha-iodopropionate, vinyl alpha-bromovalerate and the like. The copolymerization of such monomers with vinylidene cyanide is described in U.S. Patent 2,615,876, issued October 28, 1952;

(9) Vinyl halides such as vinyl chloride, vinyl bromide and the like, which are copolymerized with vinylidene cyanide as described in U.S. Patent 2,615,869, issued October 29, 1952.

In addition to interpolymers of vinylidene cyanide containing the essentially 1 to 1 molar altenating structure and essentially 50 mol percent vinylidene cyanide units, such as those disclosed in the patents referred to above, other vinylidene cyanide interpolymers have been described. For example, there are included interpolymers, of this vinylidene cyanide content, made from vinylidene cyanide and more than one copolymerizable monoolefinic compound, at least one of which forms an essentially 1:1 alternating copolymer when copolymerized with vinylidene cyanide, a large number of which interpolymers are disclosed in U.S. Patent 2,716,106.

Among the polymerizable monoolefinic compounds which form interpolymers with vinylidene cyanide are included, by way of example, the following classes of compounds:

Monoolefinic hydrocarbons, that is, monomers containing only atoms of hydrogen and carbon such as styrene; alpha-methyl styrene; alpha-ethyl styrene; isobutylene (2-methylpropene-1); 2-methyl-butene-1; 2-methyl-heptene-1; 2,3 - dimethyl-hexene-1; 2,3,4 - trimethyl-pentene-1; ethylene; propylene; butylene; amylene; hexylene and the like.

Halogenated monoolefinic hydrocarbons, that is, monomers containing carbon, hydrogen and one or more halogen atoms, such as alpha-chlorostyrene; alpha-bromostyrene; 2,5-dichlorostyrene; 3,4-dichlorostyrene; 2,6-dichlorostyrene; dichloromonofluorostyrenes; 2-chloropropene; 2-chlorohexene; 4-fluoroheptene; 1,2-dibromoethylene; 1,2-diiodoethylene and the like;

Vinyl esters of inorganic acids such as vinyl chloride, bromoethylene, iodoethylene, and fluoroethylene;

Monoolefinically unsaturated esters such as vinyl acetate, vinyl propionate, vinyl butyrate, vinyl valerate, vinyl caproate, vinyl o-chlorobenboate, vinyl m-chlorobenzoate and similar vinyl halobenzoates, vinyl p-methoxybenzoate, methyl methacrylate, propyl methacrylate, amyl methacrylate, octyl methacrylate and ethyl tiglate, methyl acrylate, ethyl acrylate, propyl acrylate, isopropyl acrylate, amyl acrylate, 3,5,5-trimethylhexylacrylate and dodecylacrylate;

Isopropenyl acetate, isopropenyl propionate, isopropenyl valerate, isopropenyl-p-chlorobenzoate, isopropenyl o-bromobenzoate, and isopropenyl alpha-bromopropionate;

Vinyl alpha-chloroacetate, vinyl alpha-bromoacetate, vinyl alpha-chloropropionate and vinyl alpha-chlorobutyrate, vinyl alpha-bromovalerate;

Allyl chloride, allyl cyanide, allyl bromide, allyl fluoride, allyl iodide, allyl nitrate, allyl thiocyanate, allyl butyrate, allyl benzoate, allyl 2,5,5-trimethyl hexoate, allyl lactate, allyl pyruvate, allyl acetoacetate, allyl thioacetate as well as methallyl esters corresponding to the above allyl esters as well as esters from such alkenyl alcohols as beta-ethyl allyl alcohol, beta-propyl allyl alcohol, and 1-buten-4-ol;

Methyl alpha-chloroacrylate, methyl alpha-bromoacrylate, ethyl alpha-chloroacrylate, propyl alpha-chloroacrylate, amyl alpha-chloroacrylate, 3,5,5-trimethyl hexyl alpha-chloroacrylate and decyl alpha-cyano acrylate;

Dimethyl maleate, diethyl maleate, dimethyl fumarate, diethyl furarate and diethyl gluconate;

Monoolefinically unsaturated organic nitriles such as acrylonitrile, methacrylonitrile, 1,1-dicyanopropene-1, crotononitrile, oleonitrile and the like;

Monoolefinically unsaturated carboxylic acids such as acrylic acid, methacrylic acid, crotonic acid, 3-butenoic acid, angelic acid, tiglic acid and the like.

Of these vinylidene cyanide copolymers a particularly useful copolymer which can readily be converted to filaments of excellent physical properties is the copolymer of vinylidene cyanide and vinyl acetate preferably consisting essentially of a regular structure of alternated units of the monomers, i.e. approximately 50 mol percent of each.

One solution to the problem previously proposed involves modification of the vinylidene cyanide polymer molecule to include therein an ethylenically unsaturated organic sulfonic acid. When present, the sulfonic acid component comprises up to about 2 mol percent, advantageously about 0.15 to 0.35 mol percent of the vinylidene cyanide polymer.

Representative sulfonic acids which may be employed include styrene sulfonic acids such as ortho-, meta- or para-styrene sulfonic acid as well as commercial mixtures thereof, ortho-, meta-, or para-sulfomethyl styrene, mixtures thereof, and substitution products thereof such as polysulfo derivatives as well as β-sulfoethyl methacrylate (isethionic acid ester of methacrylic acid), and the like. While operative, sulfonic acids wherein the sulfo group is less than three atoms removed from the ethylenic unsaturation do not produce equally good results, e.g. vinylsulfonic acid, allylsulfonic acid, methallyl sulfonic acid and the like.

While the balance of the units making up the copolymer may be any of those disclosed in the above-identified patents, advantageously the balance of the units comprises about 45 to 55 mol percent of vinylidene cyanide and about 45 to 55 mol percent of a monoolefin, especially an unsaturated ester and particularly an unsubstituted ester containing fewer than about seven carbon atoms, e.g. methyl methacrylate and particularly vinyl acetate. Preferably vinylidene cyanide and vinyl acetate are present in approximately equimolar proportions, although the vinylidene cyanide may be present in lesser amount, e.g. 30 mol percent.

While the resulting polymer is more receptive to cationic dyes than a polymer lacking the sulfonic acid units, it is still not as readily dyeable as some natural fibers. In addition, even the modified polymer is not receptive to disperse dyes.

The molecular weight of these polymers and copolymers usually exceeds about 10,000, advantageously exceeds about 20,000 and preferably ranges from about 25,000 to 1,000,000. The inherent viscosity of these polymers is at least about 0.5, advantageously about 1 to 3 and preferably about 1.5 to 2.5 as determined in γ-butyrolactone at 25° C.

It is accordingly an object of the present invention further to improve the dyeability of the above-mentioned polymers of vinylidene cyanide.

Other objects and advantages of the invention will become apparent from the following detailed description and claims wherein all parts are by weight unless otherwise specified.

In accordance with the present invention it has been found that the dyeability of polymers of vinylidene cyanide can be improved if there is incorporated therein as an additive a poly-alkylene glycol or an ether and/or ester thereof containing at least about 3 alkylene glycol units. Representative additives include poly-ethylene glycol, poly-propylene glycol, poly-butylene glycol, copolymers of ethylene oxide with propylene oxide and/or butylene oxide, ethylene oxide adduct of sorbitan monolaurate (poly-oxyethylene sorbitan monolaurate), lauryl mono-ether of poly-ethylene glycol, lauric acid mono-ester of poly-ethylene glycol, stearic acid mono-ester of poly-ethylene glycol, ethylene oxide adduct of castor oil or hydrogenated castor oil, tall oil ester of poly-ethylene glycol, benzoic acid di-ester of poly-ethylene glycol, oleic acid di-ester of poly-ethylene glycol, stearic acid tri-ester of the ethylene oxide adduct to sorbitan, ethylene oxide adduct to propylene glycol mono stearate, linear polyesters of dicarboxylic acids such as sebacic and/or azeleic acid and poly-ethylene glycol, linear polyethers of poly-ethylene glycol and the glycidyl di-ether of di-(p-hydroxyphenyl)-dimethyl-methane, chlorine terminated linear polyethers of poly-ethylene glycol and excess epi-chlorhydrin, and the like. Advantageously the additive molecules have a molecular weight of at least about 350 and preferably at least about 10,000. Advantageously on the average they include at least about 3 and preferably at least about 30 alkylene glycol units per molecule. Materials giving especially good results include poly-ethylene glycol having a crystalline structure and a molecular weight ranging between 70,000 and 1,000,000. Best results have been obtained using poly-ethylene glycol having a molecular weight of about 10,000 to 50,000 and especially about 20,000, i.e about 225 to 1125 units and especially about 450 units of ethylene glycol.

The additive is blended into the vinylidene cyanide polymer in an amount ranging from about 4 to 12% and preferably about 6 to 10% of the total weight, i.e. about 2 to 6% and preferably about 3 to 5% of the weight of vinylidene cyanide in the polymer. Smaller amounts of additive do not improve the dyeability to the same extent while larger amounts than those indicated tend to lower the safe ironing temperature of fabrics made therefrom. Surprisingly, although the additive theoretically "dilutes" the vinylidene cyanide polymer the physical properties such as tenacity and elongation of fibers made from the blend are substantially the same as those of fibers made from an equal weight of vinylidene cyanide polymer alone.

Homogeneous, intimate blending can be effected by mixing the vinylidene cyanide polymer in molten state with the additive as a liquid or as a solid to be dissolved therein. Preferably, however, the vinylidene cyanide polymer and additive are dissolved in a common solvent or in different solvents which are then mixed. The melt or solution can be converted to flake which can be used for producing shaped structures such as tubing, film, filaments or moldings; alternatively the melt or solution can be directly extruded or molded into the shaped structures. In converting the blend of vinylidene cyanide polymer and additive to filaments wet, dry or melt spinning may be employed. Especially suitable techniques involve wet spinning a solution of the blend in dimethylformamide into an aqueous coagulant in accordance with U.S. Patent 2,615,866 or wet spinning a solution of the polymer in concentrated acetonitrile into an aqueous coagulant in accordance with U.S. Patent 2,862,903, or the like. If desired, pigments, delustrants and/or dyeability-improving additives may be present in the solution being spun.

A particular advantage of additives having a molecular weight in excess of about 10,000 is that they permit wet spinning into water or an aqueous spin bath, i.e. they will stay in the fiber rather than leaching out into the spin bath; similarly, they will not leach out into any aqueous dyebath or wash with resultant change in properties of the residual material.

The novel products may be dyed while still in unshaped form or they may first be shaped and subsequently dyed, as is more conventional with synthetic fibers, either as filaments, fibers, yarn, or fabric. Conventional cationic and/or disperse dyes may be employed in conventional manner. Dyeing is sufficiently rapid and substantive that by proper selection of dyes other fibers such as acetate, nylon, viscose, cotton, wool, or the like, may be present and will not be stained.

The invention will be further described in the following illustrative examples.

*Example I*

In 80 parts of 85/15 acetonitrile/water there are dissolved 18 parts of a terpolymer comprising about 49.85 mol percent of vinylidene cyanide, 49.85 mol percent of vinyl acetate and 0.3 mol percent of styrene sulfonic acid units. The vinylidene cyanide and vinyl acetate units in the terpolymer are essentially in alternating sequence. To this solution there are added 2 parts of poly-ethylene glycol having an average molecular weight of about 20,000 and the solution is spun into 3 denier filaments according to U.S. Patent 2,862,903. Dyeing the filaments at 97° C. for 3 hours with 1% of dye on the weight of fiber as well as with 4% produces deep shades and high levels of exhaustion with the cationic dyes Sevron Blue B, Sevron Brilliant Red 4G (Basic Red 14) and Sevron Yellow L (Basic Yellow 13) as well as with the disperse dyes Eastman Blue BNN (Disperse Blue 3), Eastman Red NGLF (Disperse Red 35) and Eastman Blue BGLF (Disperse Blue 27). The dyeings are of satisfactory wash-fastness, lightfastness, gasfastness and resistance to O-fading. The fiber physical properties compare favorably with those of fibers made up of 50/50 vinylidene cyanide/vinyl acetate copolymers on a mol basis, the loop properties and the ease of heat setting being significantly better.

*Example II*

If the terpolymer in Example I is replaced by equimolar vinylidene cyanide/vinyl acetate copolymer, the resulting fibers are still dyeable with disperse dyes but are not appreciably dyeable with cationic dyes.

*Example III*

The process of Example I is repeated, replacing the poly-ethylene glycol by the adduct of 200 mols of ethylene oxide to castor oil.

*Example IV*

The process of Example II is repeated, replacing the poly-ethylene glycol by the adduct of 200 mols of ethylene oxide to castor oil.

*Example V*

Films are cast from solutions in 85/15 acetonitrile/water of the terpolymer of Example I with ⅑ its weight of the following additives, the films being dried in the oven at 80° C.:

(a) Benzoic acid di-ester of poly-ethylene glycol,
(b) High molecular weight homopolymer of ethylene oxide,
(c) Stearic acid triester of the adduct of ethylene oxide to sorbitan,
(d) Adduct of ethylene oxide to propylene glycol mono-stearate.
(e) Adduct of 300 mols of ethylene oxide to castor oil.

The films dye readily with cationic and disperse dyes.

*Example VI*

Disperse dyeable films are cast from a solution in acetonitrile of equimolar vinylidene cyanide/vinyl acetate copolymer and 1 part of (a) Lauric acid mono-ester of poly-ethylene glycol having an average of about 18 oxyethylene units,
(b) Oleic acid di-ester of poly-ethylene glycol having an average of about 18 oxyethylene units.

*Example VII*

Disperse dyeable films are cast from a solution in dimethylformamide of 9 parts of equimolar vinylidene cyanide/vinyl acetate copolymer and 1 part of (a) The tall oil ester of pentadecyl-ethylene glycol,
(b) Crystalline poly-ethylene glycol having an average molecular weight of about 200,000,
(c) Crystalline poly-ethylene glycol having an average molecular weight of about 2,000,000.

It is to be understood that the foregoing detailed description is given merely by way of illustration and that many variations may be made therein without departing from the spirit of our invention.

Having described our invention what we desire to secure by Letters Patent is:

1. A substantially homogeneous, intimate blend consisting essentially of (1) a filament-forming vinylidene cyanide polymer containing at least 30 mole percent vinylidene cyanide units therein and having an inherent viscosity of at least 0.5 as determined in gamma-butyrolactone at 25° C. and, as an additive to improve dyeability of the polymer, (2) about 4 to 12% based on the weight of vinylidene cyanide units in said polymer, of a substance selected from the group consisting of polyalkylene glycols having from 2 to 4 carbon atoms in the alkylene groups and containing at least 3 alkylene glycol units in the main polymer chain, ethers of said polyalkylene glycols selected from the group consisting of the lauryl mono-ether of polyethylene glycol, linear polyethers of polyethylene glycol and the glycidyl di-ether of di-(p-hydroxyphenyl)-dimethyl-methane, and chlorine terminated linear polyethers of polyethylene glycol and excess epichlorhydrin, and esters of said polyalkylene glycols selected from the group consisting of polyoxyethylene sorbitan monolaurate, lauric acid mono-ester of polyethylene glycol, stearic acid mono-ester of polyethylene glycol, ethylene oxide adduct of castor oil, ethylene oxide adduct of hydrogenated castor oil, tall oil ester of polyethylene glycol, benzoic acid di-ester of polyethylene glycol, oleic acid di-ester of polyethylene glycol, stearic acid tri-ester of the ethylene oxide adduct to sorbitan, ethylene oxide adduct to propylene glycol monostearate, linear polyester of sebacic acid and polyethylene glycol, and linear polyester of azeleic acid and polyethylene glycol.

2. The composition of claim 1 wherein said additive is a polyalkylene glycol containing at least 30 alkylene glycol units.

3. A composition according to claim 1 wherein said polymer consists essentially of alternating units of vinylidene cyanide and an unsaturated ester.

4. A composition according to claim 1 wherein said polymer comprises about 0.15 to 2 mol percent of an ethylenically unsaturated organic sulfonic acid.

5. A composition according to claim 1 wherein said polymer consists essentially of alternating units of vinylidene cyanide and vinyl acetate and comprises about 0.15 to 2 mol percent of styrene sulfonic acid units.

6. A composition according to claim 5 wherein said additive comprises a poly-ethylene glycol having a molecular weight between about 350 and 2,000,000.

7. A filament formed from a substantially homogeneous, intimate blend consisting essentially of (1) a filament-forming vinylidene cyanide polymer containing at least 30 mole percent vinylidene cyanide units therein and having an inherent viscosity of at least 0.5 as determined in gamma-butyrolactone at 25° C. and, as an additive to improve dyeability of the polymer, (2) about 4 to 12% based on the weight of vinylidene cyanide units in said polymer, of a substance selected from the group consisting of polyalkylene glycols having from 2 to 4 carbon atoms in the alkylene groups and containing at least 3 alkylene glycol units in the main polymer chain, ethers of said polyalkylene glycols selected from the group consisting of the lauryl mono-ether of polyethylene glycol, linear polyethers of polyethylene glycol and the glycidyl di-ether of di-(p-hydroxyphenyl)-dimethyl-methane, and chlorine terminated linear polyethers of polyethylene glycol and excess epichlorhydrin, and esters of said polyalkylene glycols selected from the group consisting of polyoxyethylene sorbitan monolaurate, lauric acid mono-ester of polyethylene glycol, stearic acid mono-ester of polyethylene glycol, ethylene oxide adduct of castor oil, ethylene oxide adduct of hydrogenated castor oil, tall oil ester of polyethylene glycol, benzoic acid di-ester of polyethylene glycol, oleic acid di-ester and polyethylene glycol, stearic acid tri-ester of the ethylene oxide adduct to sorbitan, ethylene oxide adduct to propylene glycol monostearate, linear polyester of sebacic acid and the polyethylene glycol, and linear polyester of azeleic acid and polyethylene glycol.

8. Filamentary material according to claim 7 wherein said polymer consists essentially of alternating units of vinylidene cyanide and an unsaturated ester.

9. Filamentary material according to claim 7 wherein said polymer comprises about 0.15 to 2 mol percent of an ethylenically unsaturated organic sulfonic acid.

10. Filamentary material according to claim 7 wherein said polymer consists essentially of alternating units of vinylidene cyanide and vinyl acetate and comprises about 0.15 to 2 mol percent of styrene sulfonic acid units.

11. Filamentary material according to claim 10 wherein said additive comprises a poly-ethylene glycol having a molecular weight between about 350 and 2,000,000.

References Cited by the Examiner

UNITED STATES PATENTS

| | | | |
|---|---|---|---|
| 1,970,578 | 8/34 | Schoeller et al. | 8—93 |
| 2,589,294 | 3/52 | Schmidt et al. | 260—78.4 |
| 2,628,954 | 2/53 | Gilbert | 260—78.5 |
| 2,848,296 | 8/58 | Heller | 8—93 |
| 2,874,023 | 2/59 | Walter | 260—874 |
| 3,053,789 | 9/62 | De Witt | 260—895 |
| 3,066,113 | 11/62 | Arnold | 260—873 |

MURRAY TILLMAN, *Primary Examiner.*

LEON J. BERCOVITZ, MORRIS LIEBMAN,
*Examiners.*